US005596574A

United States Patent [19]
Perlman et al.

[11] Patent Number: 5,596,574
[45] Date of Patent: Jan. 21, 1997

[54] METHOD AND APPARATUS FOR SYNCHRONIZING DATA TRANSMISSION WITH ON-DEMAND LINKS OF A NETWORK

[75] Inventors: Radia J. Perlman, Acton, Mass.; Neal D. Castagnoli, Morgan Hill, Calif.

[73] Assignee: Novell, Inc., Orem, Utah

[21] Appl. No.: 498,640

[22] Filed: Jul. 6, 1995

[51] Int. Cl.⁶ .................................................. H04L 12/56
[52] U.S. Cl. .......................................... 370/389; 370/449
[58] Field of Search ............................. 370/60, 60.1, 61, 370/94.1, 94.2, 94.3, 110.1, 85.8, 95.2; 395/200.1, 200.6, 200.12

[56] References Cited

U.S. PATENT DOCUMENTS 5,315,595   5/1994   Allouis et al. ..................... 370/110.1
5,408,468   4/1995   Peterson ............................. 370/58.2
5,448,566   9/1995   Richter et al. ...................... 370/94.1
5,491,800   2/1996   Goldsmith et al. ................ 395/200.12

Primary Examiner—Hassan Kizou
Attorney, Agent, or Firm—Cesari and McKenna

[57] ABSTRACT

A novel synchronization mechanism synchronizes delivery of data packets over on-demand links of a computer network in a manner that efficiently utilizes those links. The mechanism comprises control information generated by a source node and stored in a network layer header of a data packet transmitted to a destination node via at least one router coupled to an on-demand link of the network. Depending upon the state of the control information the router is instructed whether to immediately dial the link to establish a connection for delivery of the packet to the destination node.

19 Claims, 7 Drawing Sheets

METHOD AND APPARATUS FOR SYNCHRONIZING DATA TRANSMISSION WITH ON-DEMAND LINKS OF A NETWORK

FIELD OF THE INVENTION

This invention relates generally to computer networks and, more particularly, to efficient utilization of on-demand communication links of a computer network.

BACKGROUND OF THE INVENTION

A computer network is a geographically distributed collection of interconnected communication links for transporting data between nodes, such as computers. A plurality of computer networks may be further interconnected by intermediate nodes, or routers, to extend the effective "size" of the networks, smaller groups of which may be maintained as an autonomous system or domain of nodes. These nodes typically communicate by exchanging discrete "packets" of data according to predefined protocols. In this context, a protocol consists of a set of rules defining how the nodes interact with each other.

The communication links forming the networks may be permanently installed to their interconnected nodes, as in the case of an Ethernet communications system, or they may be dial-up lines of a switched telephone network that remain ordinarily unconnected. These dial-up lines are typically "brought-up", i.e., dialed, by the routers to initiate node-to-node communication on-demand; accordingly, these lines are also known as on-demand links. An example of a network that utilizes on-demand links is the Integrated Services Digital Network (ISDN).

In order to reduce design complexity, most networks are organized as a series of hardware and software levels or "layers" within each node. These layers interact to format data for transfer between, e.g., a source node and a destination node communicating over the network. Specifically, predetermined services are performed on the data as it passes through each layer and the layers communicate with each other by means of the predefined protocols. This layered design permits each layer to offer selected services to other layers using a standardized interface that shields those layers from the details of actual implementation of the services.

In an attempt to standardize network architectures, i.e., the sets of layers and protocols used within a network, a generalized model has been proposed by the International Standards Organization (ISO). The model, called the Open Systems Interconnection (OSI) reference model, is directed to the interconnection of systems that are "open" for communication with other systems. The proposed OSI model has seven layers which are termed, in ascending interfacing order, the physical, data link, network, transport, session, presentation, and application layers. These layers are arranged to form a "protocol stack" in each node of the network.

FIG. 1 illustrates a schematic block diagram of prior art protocol stacks 125 and 175 used to transmit data between a source node 110 and a destination node 150, respectively, of a computer network 100. Each protocol stack is structured according to the OSI seven-layer model; accordingly, each stack comprises a collection of protocols, one per layer. As can be seen, the protocol stacks 125 and 175 are physically connected through a communications channel 180 at the physical layers 124 and 164. For ease of description, the protocol stack 125 will be described.

Broadly stated, the physical layer 124 transmits a raw data bit stream over a communication channel 180, while the data link layer 122 manipulates the bit stream and transforms it into a datastream that appears free of transmission errors. This latter task is accomplished by dividing the transmitted data into frames and transmitting the frames sequentially, accompanied with error correcting mechanisms for detecting or correcting errors. The network layer 120 routes data packets from the source node to the destination node by selecting one of many alternative paths through the physical network. The transport layer 118 accepts the datastream from the session layer 116, apportions it into smaller units (if necessary), passes the smaller units to the network layer 120 and provides appropriate mechanisms to ensure that all the units arrive correctly at the destination.

The session layer 116 establishes data transfer "sessions" between software processes on the source and destination nodes, along with management of such sessions in an orderly fashion. That is, a session not only allows ordinary data transport between the nodes, but it also provides enhanced services in some applications. The presentation layer 114 performs frequently-requested functions relating to the presentation of transmitted data, including encoding of data into standard formats, while the application layer 112 contains a variety of protocols that are commonly needed by processes executing on the nodes.

Data transmission over the network 100 therefore consists of generating data in, e.g., a sending process 104 executing on the source node 110, passing that data to the application layer 112 and down through the layers of the protocol stack 125, where the data are sequentially formatted as a packet for delivery onto the channel 180 as bits. Those packet bits are then transmitted to the protocol stack 175 of the destination node 150, where they are passed up that stack to a receiving process 174. Data flow is schematically illustrated by solid arrows.

Although actual data transmission occurs vertically through the stacks, each layer is programmed as though such transmission were horizontal. That is, each layer in the source node 100 is programmed to transmit data to its corresponding layer in the destination node 150, as schematically shown by dotted arrows. To achieve this effect, each layer of the protocol stack 125 in the source node 110 typically adds information (in the form of a header field) to the data packet generated by the sending process as the packet descends the stack. At the destination node 150, the various headers are stripped off one-by-one as the packet propagates up the layers of stack 175 until it arrives at the receiving process.

As noted, a significant function of each layer in the OSI model is to provide services to the other layers. Two types of services offered by the layers are "connection-oriented" and "connectionless" network services. In a connection-oriented service, the source node establishes a connection with a destination node and, after sending a packet, terminates the connection. The overhead associated with establishing the connection may be unattractive for nodes requiring efficient communication performance. For this case, a fully connectionless service is desirable where each transmitted packet carries the full address of its destination through the network.

Network layer protocols are generally used to implement a connectionless network service, the latter of which primarily defines a packet format. When the network layer receives a packet from the transport layer for transmission over the network, it adds (to the packet) a header containing, inter alia, source and destination addresses. Examples of network layer protocols are the connectionless network layer protocol (CLNP) defined by ISO, the Internet (IP) network layer protocol and the Internet Packet Exchange (IPX) protocol.

The overall packet formats of the CLNP and IP headers may be extended to accommodate added features by way of option fields contained within the headers defined by the network layer services. The types of options supported by these fields typically include source routing, priority and security-specific information. However, the conventional IPX header format is generally not expandable since its header was not designed to accomodate appended fields in a manner that is compatible with the remaining fields of the packet.

As also noted, a router is used to bring-up an on-demand link of a network, typically in response to the reception of a data packet intended to be forwarded over the link. However each time the link is dialed, connection charges are incurred. Certain types of data packets are exchanged in accordance with non-time critical applications, such as synchronizing distributed databases with respect to directory services. This type of computer-to-computer traffic is flexible as to when packet transmission occurs and the present invention is directed to synchronizing delivery of such traffic until times when the on-demand link is dialed for other compelling reasons.

SUMMARY OF THE INVENTION

The invention comprises a mechanism for synchronizing delivery of types of data packets over on-demand links of a computer network in a manner that efficiently utilizes those links. The novel synchronization mechanism comprises control information generated by a source node and generally stored in a network layer header of a data packet transmitted to a destination node via at least one router coupled to an on-demand link of the network. Depending upon the state of the control information, the router is instructed whether to immediately dial the link to establish a connection for delivery of the packet to the destination node.

Preferably, the control information is incorporated within the network layer header as an option. In the case of network layer headers that support option fields, such as the connectionless network layer protocol (CLNP) and the Internet (IP) network layer protocol headers, a new option type is defined for on-demand links. The Internet Packet Exchange (IPX) protocol header, however, does not accomodate option fields and, thus, a network addressing arrangement is provided that expands the format of this header to support the novel control information, e.g., a flag, as an option.

In the illustrative embodiment of the invention, if the novel flag is asserted, the router is instructed "not to dial the on-demand link". When the router receives a data packet with an asserted flag, it stores certain information contained in the packet that is sufficient to identify the sending process within a source node and discards the remainder of the packet prior to sending a return packet to the source. The return packet preferably includes complete source and destination addresses of the data packet, i.e., information sufficient to identify a process within the source node sending that packet, along with a reason for returning that packet (e.g., "on-demand link not currently dialed"). Furthermore, the router keeps track of these source and destination addresses so that when it eventually brings-up the link, it can send a subsequent notification packet to the source indicating that the on-demand link is currently available for transmission of the data packet to the destination.

Synchronization of particular types of data packets, e.g., periodically transmitted data packets that are not time critical, with an on-demand link may be further realized by requiring the source node to periodically poll the router to test whether the link is connected. This technique is less optimal than that of the illustrative embodiment because of an increase in network bandwidth necessitated by the polling traffic; however, it may be useful as a backup mechanism in the event the router "crashes" and loses the information needed to identify the sending process within the source node.

In an alternate embodiment, the router may store the data packet with the asserted flag and, when the on-demand link is subsequently dialed, send the packet to the destination node. For this embodiment, the router is not required to notify the source node that the link was previously unavailable and that the data packet was temporarily stored at the router. Although this approach reduces traffic between the router and source node, it may result in "stale" data being transmitted to the destination node if the latency incurred waiting for the link to be connected is substantial.

In yet another embodiment of the invention, the router may transmit a multicast message to all nodes of the network when the on-demand link is up. Here, the multicast message contains the novel control information which alerts sending processes of recipient source nodes that "the on-demand link is currently available for data transmission". The control information further contains information sufficient to notify the source nodes as to which destination nodes are available over the link.

In response to the multicast message, any source node wishing to transmit information over that link may then send a data packet to the router. One advantage of this embodiment is that the router need not retain the source and destination addresses of every data packet destined for an inactive on-demand link; another advantage is that source nodes need not initiate data transmission over the link until they receive the multicast message.

BRIEF DESCRIPTION OF THE DRAWINGS

The above and further advantages of the invention may be better understood by referring to the following description in conjunction with the accompanying drawings, in which like references indicate similar elements, and in which.

DETAILED DESCRIPTION OF ILLUSTRATIVE EMBODIMENT

Figure 1:
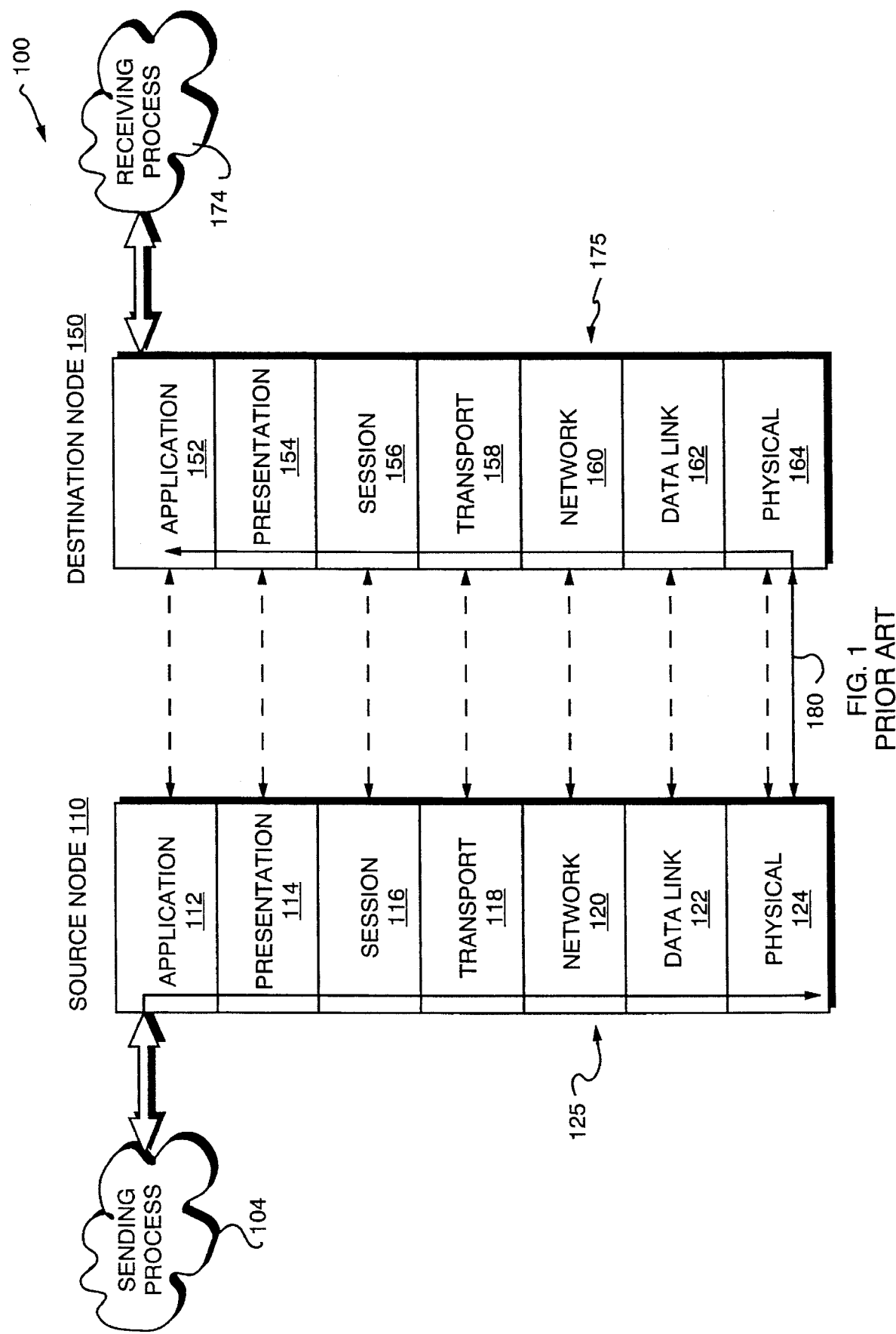
FIG. 1 is a schematic block diagram of prior art protocol stacks used to transmit data between a source node and a destination node of a computer network.
Figure 2:
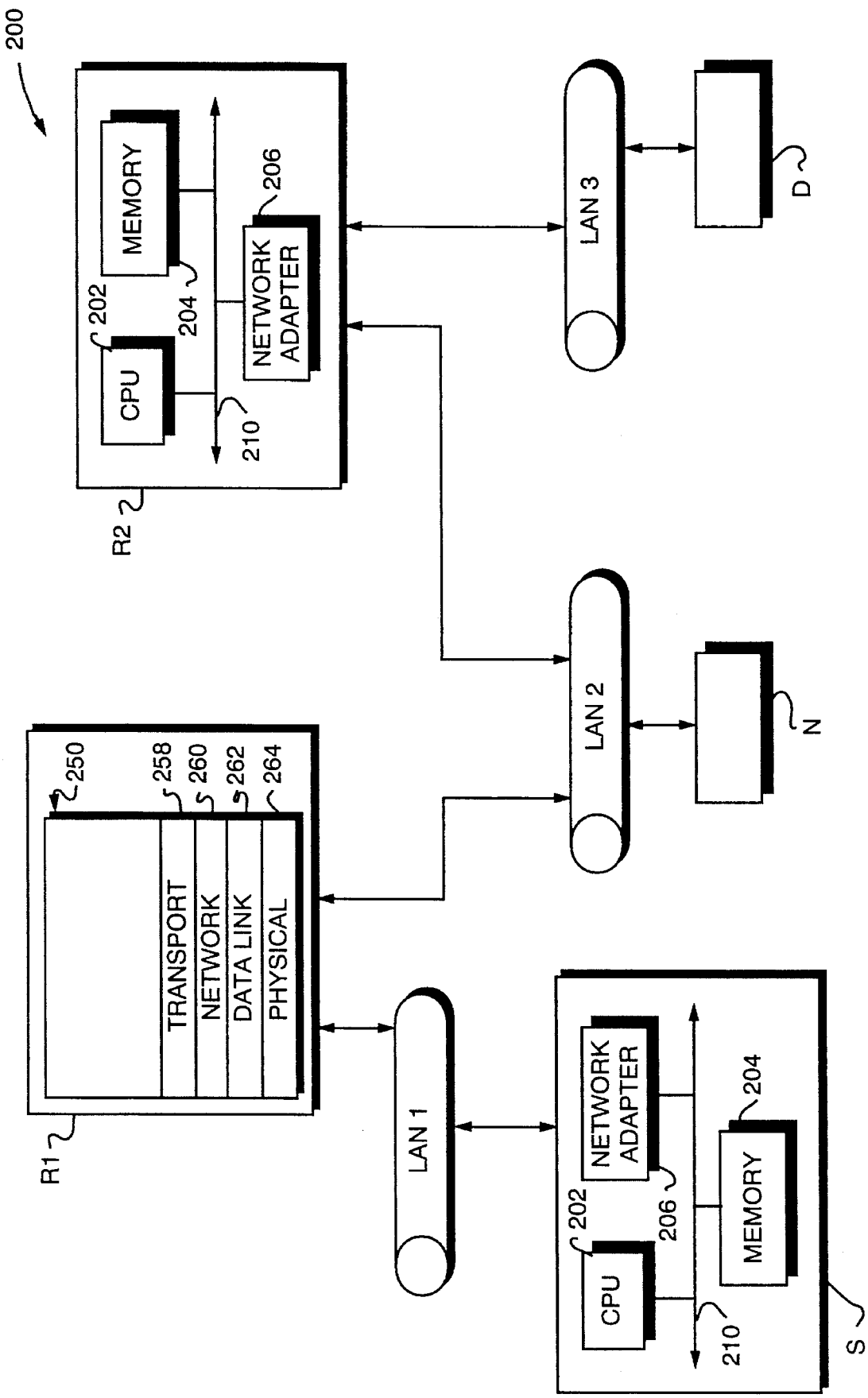
FIG. 2 is a block diagram of a network system including a collection of computer networks connected to a plurality of nodes.

FIG. 2 is a block diagram of a network system 200 comprising a collection of computer networks connected to a plurality of nodes. The nodes are typically general-purpose computers comprising a source node S, an end node N, a destination node D and a plurality of intermediate nodes R1–R2. Each node typically comprises a central processing unit (CPU) 202, a memory unit 204 and at least one network adapter 206 interconnected by a system bus 210. The memory unit 204 may comprise storage locations typically composed of random access memory (RAM) devices, which are addressable by the CPU 202 and network adapter 206. The memory unit typically provides temporary storage of information, such as executable processes and contents of data packets, as described further herein. An operating system, portions of which are typically resident in memory and executed by CPU, functionally organizes the node by, inter alia, invoking network operations in support of those processes executing in the CPU.

The computer networks included within system 200 may range from local area networks (LANs) to wide area networks (WANs). A LAN is a limited area network, while a WAN may be a public or private telecommunications facility that interconnects nodes widely dispersed using communication links. Communication among the nodes coupled to these networks is typically effected by exchanging discrete data "packets" specifying addresses of, e.g., source and destination nodes. Since the system shown in FIG. 2 comprises a relatively small group of interconnected LANs 1–3, it is preferably maintained as an autonomous domain. The intermediate nodes are preferably routers configured to facilitate the flow of data packets throughout the domain 200 by routing those packets to the proper receiving nodes.

In general, when a source node S transmits a packet over LAN 1, the packet is sent to all nodes on that LAN. If the intended recipient of the packet is connected to LAN 3, the packet is routed through router R1, over LAN 2 and through R2 onto LAN 3. A key function of a router is determining the next node to which the packet is sent; this routing function is preferably performed by network layer 260 of a protocol stack 250 within each node. Typically, the packet contains two destination addresses: the address of the final destination node and the address of the next node along the route. The final destination address remains constant as the packet traverses the networks, while the next destination address changes as the packet moves from node to node along the route through the networks.

Specifically, when source node S sends a packet to destination node D, i.e., the final destination address, the packet is transmitted onto LAN 1 with a next destination address specifying the address of router R1. Address information embedded in the packet, which is processed by the higher-layer software of the protocol stack 250, identifies the final destination of the packet as node D. Based on this information, R1 determines that the next node along the route is router R2 and proceeds to pass the packet onto LAN 2 for reception by that node. Router R2 then determines that the next node is the final destination node D and transmits the packet over LAN 3 to node D.

Figure 3:
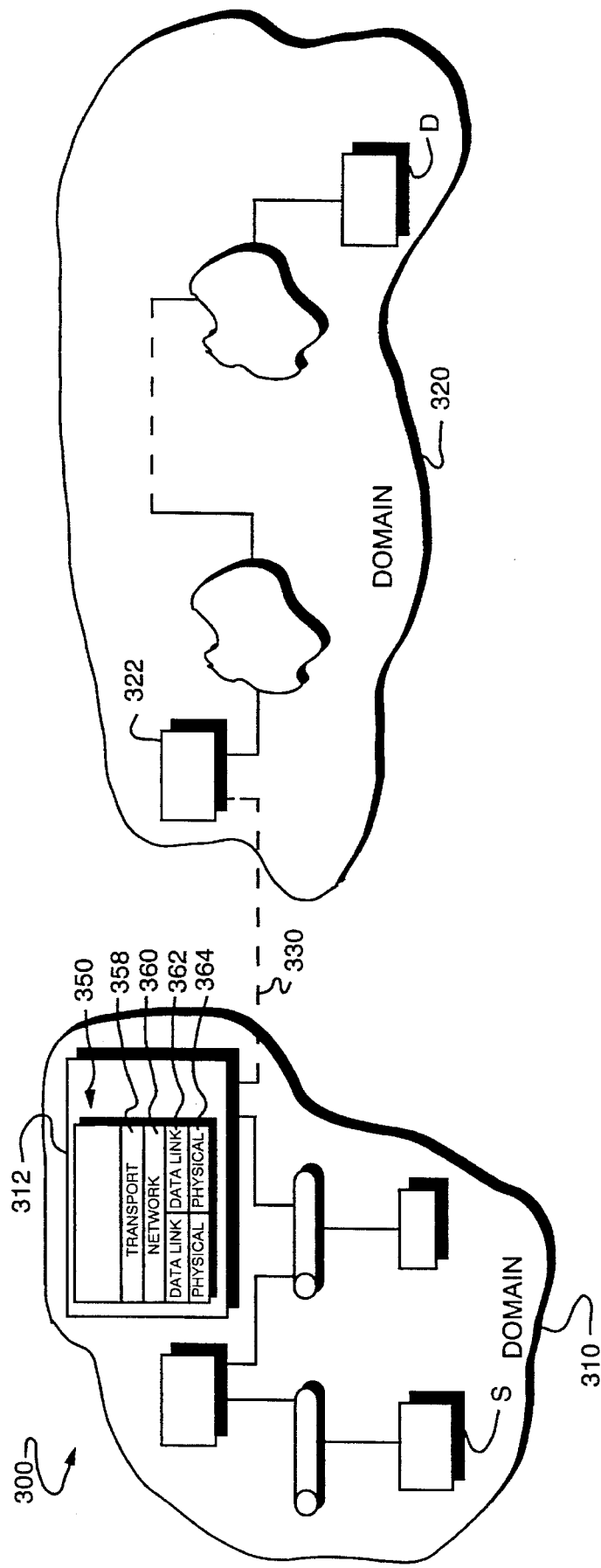
FIG. 3 is schematic block diagram of a system having a plurality of domains interconnected by an on-demand link in which a novel synchronization mechanism of the present invention may be advantageously used.

FIG. 3 is a schematic block diagram of a system 300 comprising a plurality of domains 310 and 320 interconnected by a communication link 330 coupled to routers 312 and 322. The communication link 330 is preferably a temporary link that may be "brought-up", i.e., dialed, by the routers to initiate node-to-node communication on-demand; that is, on-demand link 330 may be embodied as a dial-up link of a switched telephone network that remains ordinarily unconnected. In the illustrative embodiment, the on-demand link may comprise an Integrated Services Digital Network (ISDN) line, while the domains interconnected by the link may include independent Internet Packet Exchange (IPX) networks, such as the Novell Corporate IPX network and the Microsoft Corporate IPX network.

Typically, the router 312 dials the on-demand link 330 in response to the reception of a data packet from source node S that is destined for destination node D. Each time the link is dialed, though, connection charges similar to those of any switched telephone line are incurred. Yet, certain types of data packets are transmitted in accordance with non-time critical applications, such as electronic mail or synchronizing distributed databases associated with directory services. This type of computer-to-computer traffic is generally flexible as to when data transmission occurs and, as noted, the present invention is directed to synchronizing delivery of such traffic until times when the on-demand link is otherwise dialed.

For routers 312 and 322 to be used in system 300, the interconnected networks must share the same network layer protocols and must be compatible at the higher protocol stack layers. The networks may, however, differ at the data link layer 362 and the physical layer 364, as shown schematically in the protocol stack 350 of router 312. Although the routers may operate with any network layer protocol, in the illustrative embodiment described herein, the network layer protocols are preferably the connectionless network layer protocol (CLNP), the Internet (IP) network layer protocol and the IPX protocol.

Figure 4A:
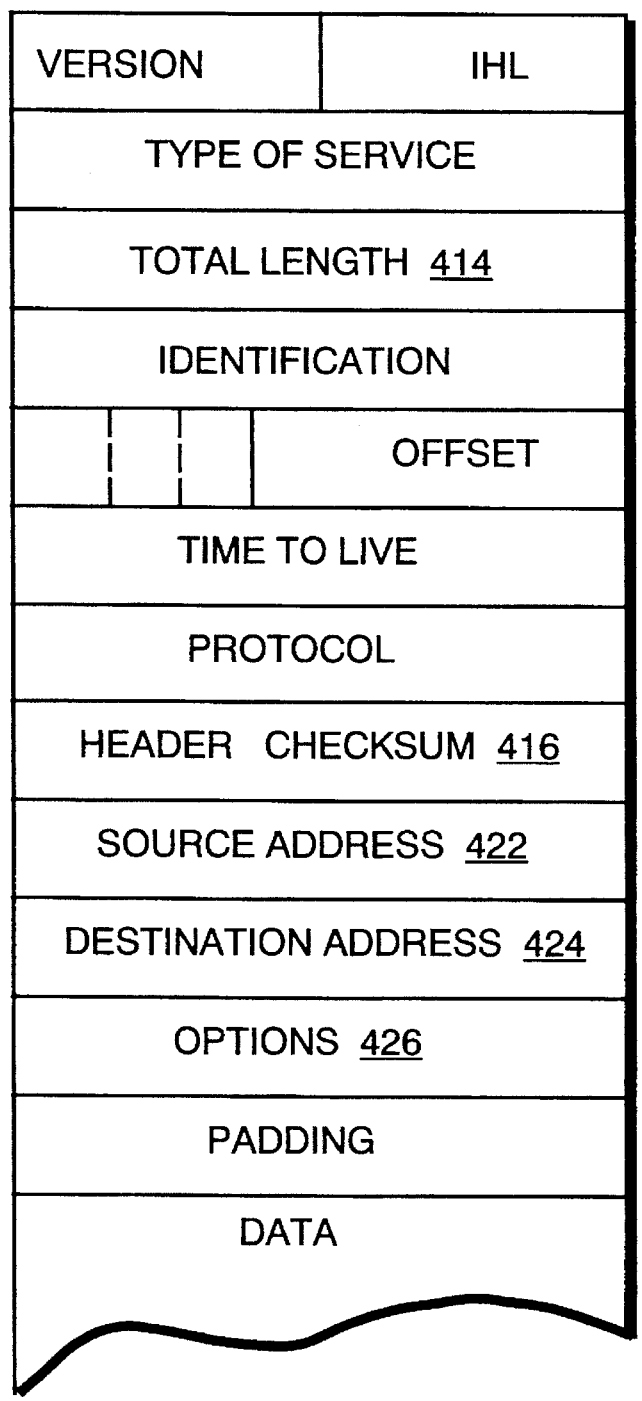
FIGS. 4A–4C are schematic diagrams of option fields of conventional network layer headers for storing the novel synchronization mechanism in accordance with the invention.
Figure 4B:
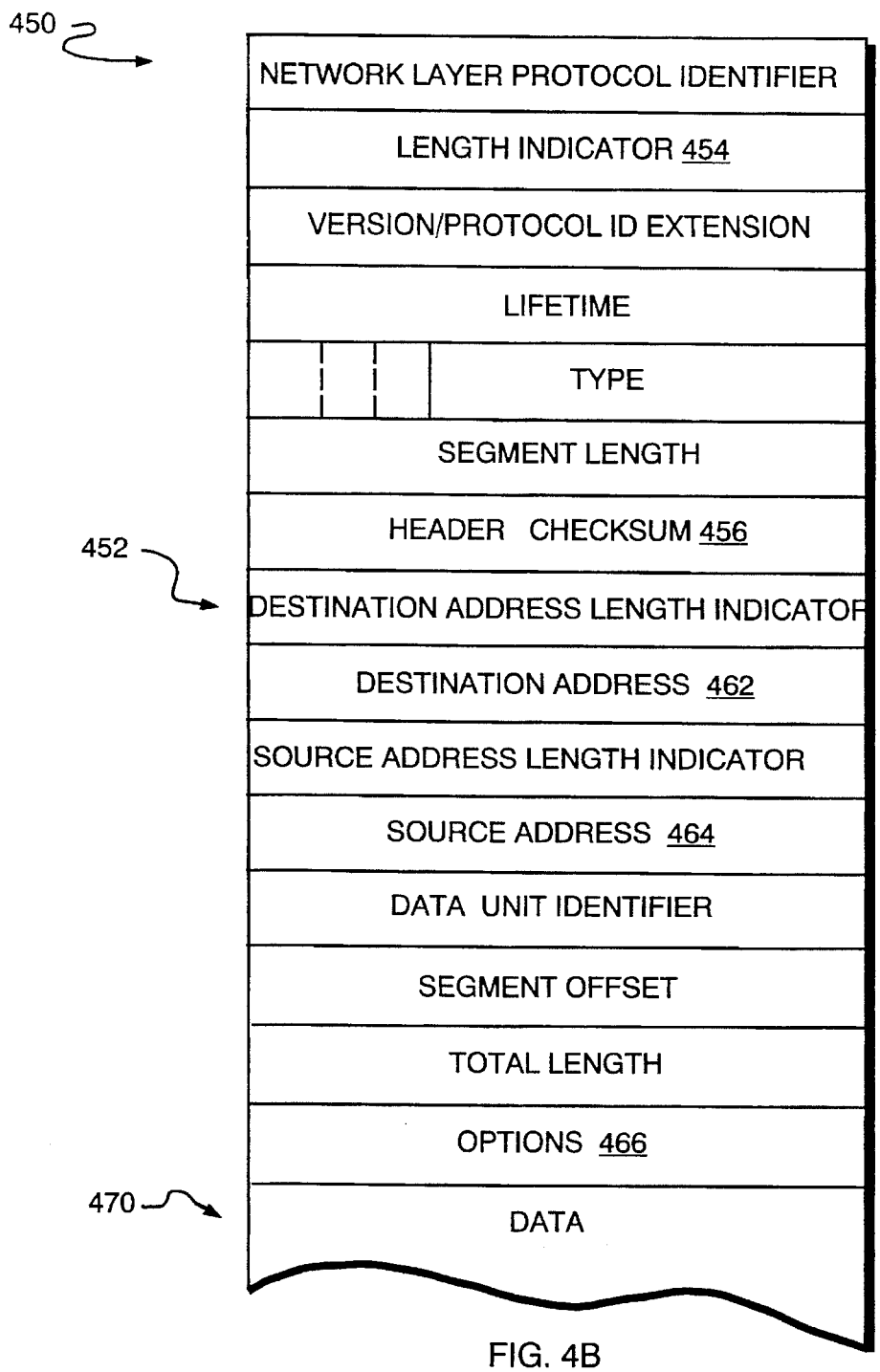
Figure 4C:
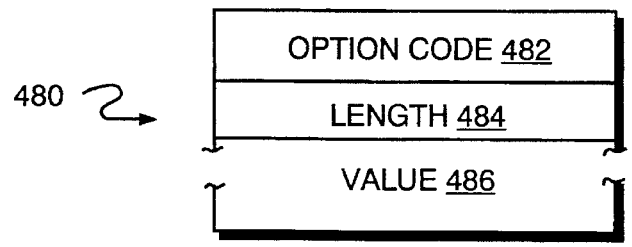

As further noted, when the network layer 360 receives a data packet from the transport layer 358 for transmission over the network, it adds a network layer header to the packet. The formats of these header fields are generally the same among all network layer services primarily because the same information are typically contained in each packet. FIGS. 4A and 4B depict the formats of IP and CLNP network layer packets 410 and 450, respectively. It can be seen that both of these packets generally contain information pertaining to their headers 412 and 452 (e.g., length and checksum fields); more particularly, though, each header includes an options field 426 and 466 to accommodate added features. The types of options supported by these fields typically include source routing, priority and security-specific information. FIG. 4C depicts the general format of the contents of an options field 480 which comprises an octet (1-byte) option code field 482 that uniquely defines a type of option, a 1-byte length field 484 indicating the length of the option in bytes, and a variable, e.g., 0–254 byte, value field 486.

Figure 5:
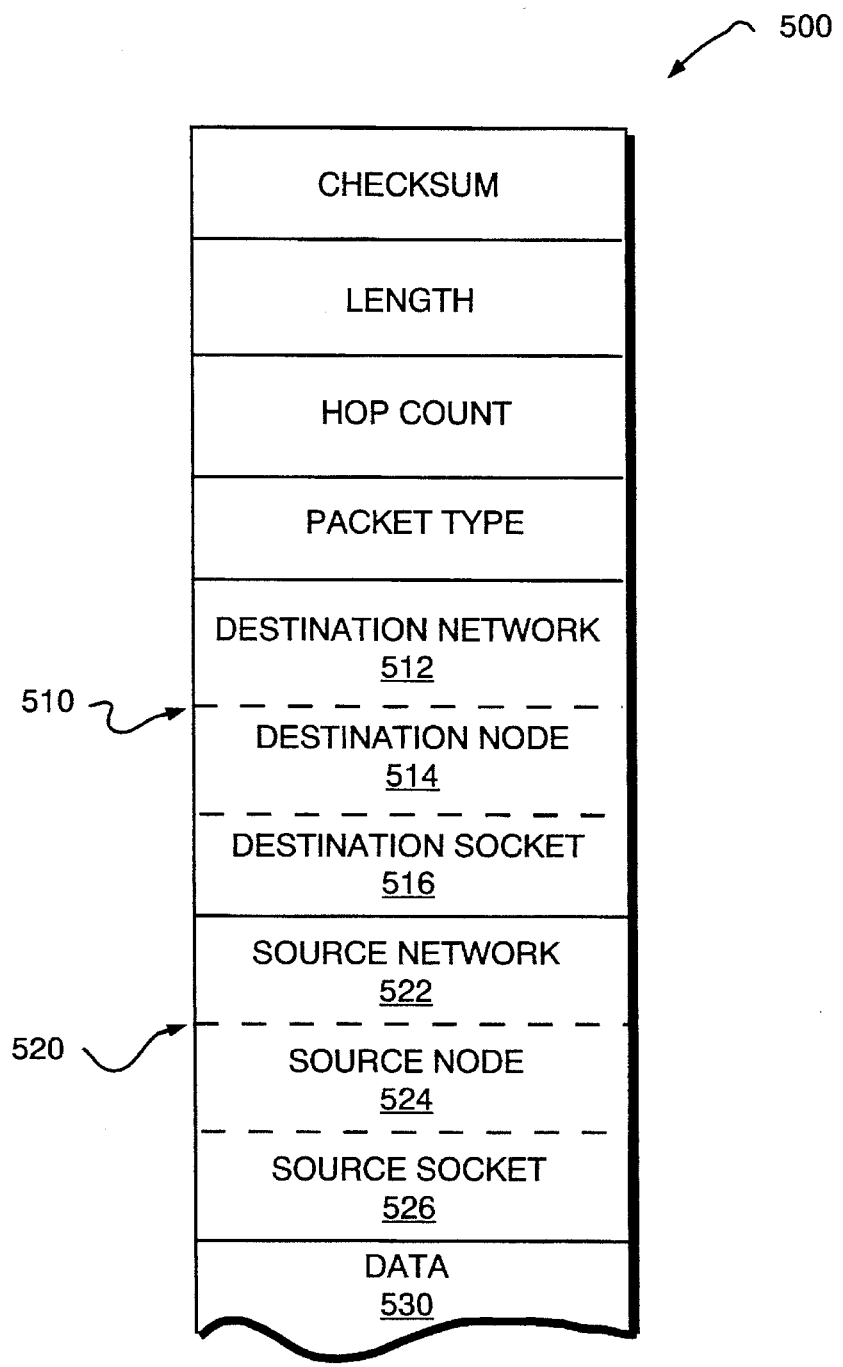
FIG. 5 is a schematic diagram depicting the format of a conventional IPX network layer header.

However, the IPX protocol header does not accomodate option fields and, thus, the invention provides a network addressing arrangement that expands the format of this header. FIG. 5 is a schematic diagram depicting the format of a conventional IPX packet 500 having a network layer header comprising approximately 30 bytes. Specifically, the header contains, inter alia, hierarchical destination and source addresses, each of which includes a plurality of address elements. For example, the destination address 510 comprises a 4-byte destination network field 512 that indicates the particular network over which the packet will travel, a 6-byte destination node field 514 identifying a data link layer address of the receiving node on that network and a 2-byte destination socket field 516 specifying the receiving process in the receiving node. Data field 530 is appended to the header, immediately following the source address field 520.

Figure 6:
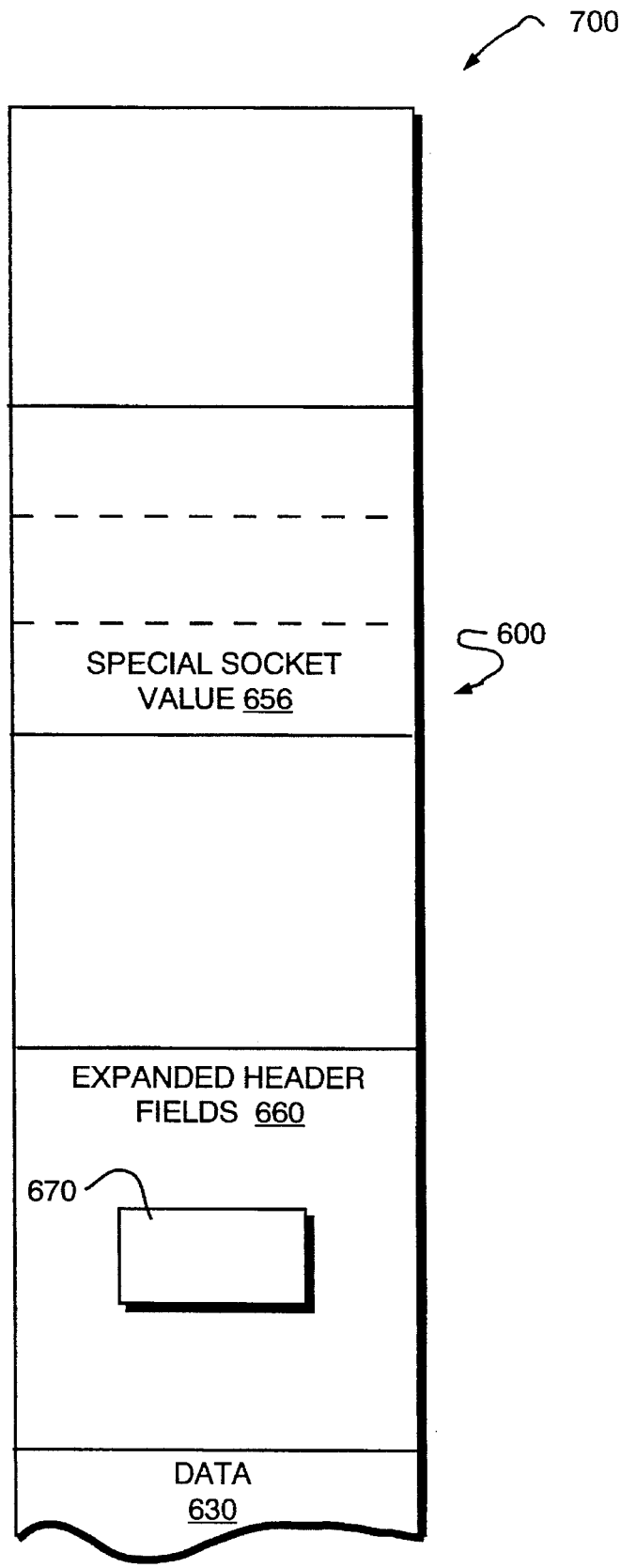
FIG. 6 is a schematic diagram illustrating an improved format of the IPX network layer header for storing the novel synchronization mechanism according to the invention.

According to the addressing arrangement, a special socket value is provided that indicates the provision of additional header information after the source address field to effectively create an improved network layer header. FIG. 6 is a schematic diagram illustrating the format of the improved IPX network layer header 600. A source node substitutes the special socket value 656 for the actual destination socket number within the 2-byte destination socket field 516 of the conventional destination address field 510. Preferably, the special socket value instructs the routers to examine the contents of expanded header fields 660 prior to forwarding packets over the networks.

In accordance with the invention, a mechanism is provided for synchronizing delivery of particular types of data packets over on-demand links of a computer network in a manner that efficiently utilizes those links. Referring now to FIGS. 1–6, the novel synchronization mechanism comprises control information generated by a source node, e.g., source node S, and stored in the network layer header of a data packet transmitted to a destination node, e.g., destination node D, via a router 312 coupled to on-demand link 330 of network system 300. Depending upon the state of the control information, the router is instructed whether to immediately dial the link to establish a connection for delivery of the packet to the destination node D.

Preferably, the control information is incorporated within the network layer header as an option. In the case of the IP and CLNP network layer protocols whose headers contain option fields, a new option type is defined for on-demand links. Specifically, the new option type comprises an option code, e.g., "ODL", stored in field 482 that uniquely specifies an on-demand link, along with information stored in value field 486 instructing the router whether to dial the on-demand link in response to reception of the packet. The total length of the option field 480 in bytes is indicated in the length field 484.

With respect to the improved IPX header 600, on the other hand, the control information is stored in a field 670 of the expanded header fields 660. Although the contents of the field comprising the control information may vary, preferably the field is provided as a novel flag 670 and the state of this flag instructs the router how to handle the on-demand link 330. In other words, when the router 312 receives a data packet having the special socket value, e.g., "SS", substituted for the actual destination socket number of the destination address, the router examines the contents of expanded header fields and, in particular, the state of the flag 670 prior to forwarding the packet over the link 330.

In the illustrative embodiment of the invention, assertion of the flag preferably instructs the router "not to dial the on-demand link". If the flag is asserted, the router stores certain information contained in the packet and discards the remaining contents of the packet prior to sending a return packet to the source. The return packet preferably includes complete source and destination addresses of the data packet, i.e., information sufficient to identify a process within the source node sending that packet, along with a reason for returning that packet (e.g., "on-demand link not currently dialed"). Additionally, the router 312 temporarily stores the source and destination addresses of the header in its memory 204 so that when it eventually brings-up the link 330, it can send a subsequent notification packet to the source node S indicating that the on-demand link 330 is currently available for transmission of the data packet to the destination node.

In an alternate embodiment of the invention, the router 312 may store the entire data packet with the asserted flag 670 in its memory 204 (FIG. 2) and, when the on-demand link 330 is subsequently dialed, send the packet to the destination node D in domain 320. For this embodiment, the router 312 is not required to notify the source node S that the link 330 was previously unavailable and that the data packet was temporarily stored at the router 312. Although this approach reduces traffic between the router and source node, it may result in "stale" data being transmitted to the destination node D if the latency incurred waiting for the link to be connected is substantial.

In yet another embodiment of the invention, the router 312 may transmit a single multicast message to all nodes of the network when the on-demand link 330 is dialed and available. Here, the multicast message contains the novel control information which, when asserted, alerts sending processes of recipient nodes that "the on-demand link is currently available for data transmission". The control information further contains information sufficient to notify the source nodes as to which destination nodes are available over the link.

Specifically, the available destination nodes are known by (i) storing the source/destination address pair information at the router. In this case, the router sends an individual packet to each source node listing the destination nodes available over the link; (ii) routing information stored at the source nodes. Here, the router need only identify the particular link that is available; and (iii) configuring the router with a summary of destination addresses reachable over the link. The router may provide this latter information to the source nodes via a multicast message.

In response to the message, any source node wishing to transmit information over the link 330 may then send a data packet to the router 312. An advantage of this embodiment is that the router 312 need not retain the source and destination addresses of every data packet destined for an inactive on-demand link; another advantage is that source nodes need not initiate data transmission over the link until they receive the multicast message.

While there has been shown and described an illustrative embodiment for synchronizing particular types of data packets, e.g., periodically transmitted data packets that are not time critical, with an on-demand link of a computer network in a manner that efficiently utilizes that link, it is to be understood that various other adaptations and modifications may be made within the spirit and scope of the invention. For example, source nodes may be configured to periodically poll a router to test whether the on-demand link is actively connected. This technique is less optimal than that of the illustrative embodiments because of an increase in network bandwidth necessitated by the polling traffic; however, it may be useful as a backup mechanism in the event the router "crashes" and loses the information needed to identify the sending processes within the source nodes.

In addition, the control information specifying whether an on-demand link should be activated may be provided to a router by way of data packet locations other than the network layer header. For example, the router may be configured to examine beyond the network layer header, i.e., it may parse the packet to analyze higher-level protocol stack layer headers, to determine whether the packet instructs the router to activate the link.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. Apparatus for synchronizing delivery of a data packet generated by a source node and transmitted over an on-demand link of a computer network to a destination node in a manner that efficiently utilizes that link, the apparatus comprising:

a router coupled to the on-demand link, the router configured to activate the link to establish a connection to another node of the network for delivery of the packet to the destination node; and means for instructing the router whether to immediately activate the link to establish the connection, the instructing means comprising control information stored in the data packet.

2. The apparatus of claim 1 wherein the control information is generated by the source node.

3. The apparatus of claim 1 wherein the control information is stored in a network layer header of the data packet.

4. The apparatus of claim 3 wherein the control information comprises an option within the network layer header.

5. The apparatus of claim 4 wherein the option is a new type of option defined for the on-demand link and contained within an option field of the header.

6. The apparatus of claim 4 wherein the option is a flag stored within an expanded header field of the header.

7. The apparatus of claim 1 wherein the control information is contained within higher-layer protocol stack headers of the data packet other than a network layer header.

8. A method for synchronizing delivery of a data packet generated by a sending process within a source node of a computer network and transmitted over an on-demand link of the network to a destination node in a manner that efficiently utilizes that link, the method comprising the steps of:

generating control information within the data packet at the sending process of the source node;

forwarding the data packet to a router coupled to the on-demand link;

examining the control information at the router, the control information instructing the router to abstain from immediately activating the link to establish a connection to another node of the network; and storing information contained within the packet at the router, the stored information being sufficient to identify the sending process within the source node.

9. The method of claim 8 further comprising the step of sending a notification packet to the sending process when the on-demand link is activated, the notification packet informing the sending process that the link is currently available for delivery of the data packet to the destination node.

10. The method of claim 8 further comprising, immediately after the step of storing, the step of sending a return packet to the source node, the return packet identifying the sending process of the source node and informing that process that the on-demand link is not currently dialed.

11. The method of claim 8 further comprising the step of sending a return packet to the source node, the return packet identifying the sending process of the source node and informing that process that the on-demand link is not currently activated.

12. The method of claim 11 further comprising, at the source node, the step of periodically polling the router to test whether the link is activated.

13. The method of claim 8 further comprising the step of storing the control information in a network layer header of the data-packet.

14. A method for synchronizing delivery of a data packet generated by a source node and transmitted over an on-demand link of a computer network to a destination node in a manner that efficiently utilizes that link, the method comprising the steps of:

generating control information within the data packet at the source node;

forwarding the packet to a router coupled to the on-demand link;

examining the control information at the router, the control information instructing the router to abstain from immediately activating the link to establish a connection to another node of the network;

storing the data packet at the router; and sending the data packet over the on-demand link to the destination node when the link is subsequently activated.

15. A method for synchronizing delivery of a data packet generated by a source node and transmitted over an on-demand link of a computer network to a destination node in a manner that efficiently utilizes that link, the method comprising the steps of:

generating control information within a multicast data packet at a router coupled to the on-demand link;

distributing the multicast packet to nodes of the network, including the source node;

examining the control information at the source node, the control information informing the source node that the on-demand link is currently available for establishing a connection to the destination node; and sending a data packet from the source node to the router for transmission over the link to the destination node.

16. Apparatus for synchronizing delivery of a data packet generated by a source node and transmitted over an on-demand link of a computer network to a destination node in a manner that efficiently utilizes that link, the apparatus comprising:

a router coupled to the on-demand link, the router configured to activate the link to establish a connection to another node of the network for delivery of the packet to the destination node; and means for instructing the router whether to immediately activate the link to establish the connection, the instructing means comprising control information generated by the source node and stored in a network layer header of the data packet.

17. The apparatus of claim 16 wherein the control information comprises an option within the network layer header.

18. The apparatus of claim 17 wherein the option is a new type of option defined for the on-demand link and contained within an option field of the header.

19. The apparatus of claim 17 wherein the option is a flag stored within an expanded header field of the header.

* * * * *